United States Patent Office 3,429,655
Patented Feb. 25, 1969

3,429,655
METHOD AND FILTER FOR REMOVING IODINE FROM GASES
Forrest N. Case, Oak Ridge, Tenn., assignor to the United States of America as represented by the United States Atomic Energy Commission
No Drawing. Filed Feb. 9, 1966, Ser. No. 526,662
U.S. Cl. 23—2                                                3 Claims
Int. Cl. B01d 50/00, 47/02

ABSTRACT OF THE DISCLOSURE

A method for removing iodine from an iodine-containing off-gas stream is provided by contacting the stream with a metallic fatty acid solution wherein the metal is selected from silver, copper, or mercury. Also provided is an iodine removal filter medium which comprises a polyurethane backing impregnated with copper oleate.

---

The invention described herein was made in the course of, or under, a contract with the U.S. Atomic Energy Commission.

This invention relates generally to filter media and more particularly to a method and apparatus for removing iodine from off-gas systems.

In the field of nuclear technology, i.e., nuclear reactors, nuclear reactor fuel reprocessing plants, production of radioisotopes and source material, etc., preventing the escape of radioactive iodine to the atmosphere is a problem of utmost importance. A number of filters have been devised for removal of radioactive iodine from off-gases. An early device comprised a charcoal filter disposed within the off-gas stream. Charcoal, however, holds iodine by sorption, and it has been observed that the sorbed iodine will move through a charcoal filter with continued purging of the process off-gas. Thus, while the escape of iodine from charcoal filters can be reduced somewhat by increasing the bed length, excessive bed length is disadvantageous in that the pressure drop in the off-gas system may become excessive. Moreover where the off-gas stream containing iodine has an appreciable amount of moisture the sorption efficiency of a charcoal filter is greatly diminished for removal of the wet iodine.

Another prior art method for removal of iodine from process off-gases has been to employ metals, which react with iodine, either in thin foil or communitive solid form as a filter medium. Previously thin metal foils of copper or silver, which react with the iodine and retain it on the surface as iodide, have been incorporated into filter media for iodine removal. Additionally, packed columns composed of, for example, Berl saddles coated with silver nitrate have been used for iodine removal from process off-gas streams. While these techniques have been widely used, they are effective only when the iodine is in the elemental form. Thus, depending on the form in which the iodine exists in the off-gas stream, the use of metal type filter media may or may not be effective.

It is therefore a primary object of the present invention to provide an effective filter medium for removal of iodine from process off-gases.

Another object is to provide an effective filter medium for removal of iodine in both elemental and compounded forms from process off-gases.

Still another object is to provide an effective filter medium comprising predominantly a liquid medium for iodine removal.

Briefly, this invention comprises employing a non-drying metal-containing solution either alone or in conjunction with a gas permeable substrate as a filter medium for removal of iodine from off-gas streams. In one embodiment the metal-containing solution is selected from the metallic fatty acids wherein the metal is further selected from the group consisting of silver, copper, and mercury. A filter medium prepared in accordance with this invention and consisting of a fine pored polyurethane dust filter saturated with a solution of copper oleate was found to contain more than about four times the radioactive $^{131}$I than did a conventional charcoal filter when tested in the cell ventilation system of an $^{131}$I production facility.

The practice of this invention may encompass a number of embodiments. The filter medium may, for example, comprise venting the off-gas stream through a quantity of the non-drying metal-containing solution to effect removal of the iodine, such as radioactive $^{131}$I, from the off-gases. On the other hand, suitable filter backings or substrates may be impregnated with the non-drying metal-containing solution and placed in the process off-gas lines. Suitable backings may comprise polyurethane, cotton gauze or any gas permeable fibrous medium. Additionally, the non-drying metal-containing solution may be dispersed in a conventional porous iodine metal filter to improve the filter efficiency and to afford removal of iodine which is not in an elemental state.

Where the solution is incorporated into a filter backing or substrate, any conventional technique may be employed to disperse the solution in the backing or substrate and preferably may be effected by submerging the filter backing or substrate in the solution. The particular dimensions of the filter backing or substrate may vary widely, depending upon the particular requirements of the off-gas stream. In general, the thickness of the filter backing or substrate should be of a depth which, when saturated with the non-drying metal-containing solution, will not produce a large pressure drop across the filter medium. Where a polyurethane filter is employed as the backing, for example, a thickness of about 4″ has been found to be quite suitable. It should be apparent that the use of this invention is susceptible to many variations. For example, a single sheet of a selected filter backing impregnated with the solution may be interposed in the off-gas line or multiple sheets may be employed in series within the off-gas line, depending upon the particular criteria for off-gas purity. In general, however, a single sheet of polyurethane backing impregnated with, for example, copper oleate solution, is quite suitable and typically removes better than 99% of the $^{131}$I carried by the off-gas system.

The mechanism of the invention appears to involve a chemical reaction between the metal in solution and the iodine or iodide in the off-gas to form a metal iodide in the filter media. Thus, while prior art metal filters removed the iodine by reaction with the metal to form a metal iodide at the surface, these prior art filters were ineffective for removal of iodine from off-gas streams where the iodine was in a form other than an elemental state. In contrast, applicant has found that, in accordance with the present invention, effective iodine removal may be accomplished irrespective of the particular form of the iodine in the off-gas stream.

The active solution may comprise any non-drying metal-containing solution which has a relatively high viscosity. Of these the metallic fatty acids such as, for example, the copper fatty acids are preferred as the active solution. In practice, copper fatty acids, e.g., oleate and stearate, have been found to be especially suitable as an effective filter medium for removal of iodine from off-gas streams. It will be appreciated that other metallic fatty acids which will react with iodine to form iodine compounds are suitable and in particular silver and mercury fatty acids in addition to the aforementioned copper fatty acids are quite suitable. These fatty acids in general are non-drying and viscous oily substances which provide a ready medium for reaction with iodine vapors transported by gases. Although not essential to the successful practice of this invention, the active solution may be further treated to improve its resistance to drying. For example, where a copper fatty acid is employed as the active solution, it may be treated with polybutene to increase its resistance to drying. Other suitable substances may be employed, such as mineral oils.

The following example demonstrates the effectiveness of a copper fatty acid as a filter medium for removal of $^{131}I$ from an off-gas stream.

Example

A fine pored polyurethane dust filter was saturated with a solution of copper oleate and placed in series with a conventional charcoal filter in the cell ventilation system of an $^{131}I$ plant. The copper oleate solution was treated with polybutene to improve its resistance to drying. The polyurethane backing consisted of two blocks of material, 2" x 24" x 24" in series.

Air from the cell ventilation system was permitted to pass through the charcoal and copper oleate filters for a period of two weeks. The copper oleate filter retained about 4 times more $^{131}I$ than the charcoal filter. In separate experiments to determine the efficiency of the copper oleate filter, the oleate filter was found to remove >99.9% of the $^{131}I$ carried by the off-gas system.

It should be apparent that while the invention has been described with particular emphasis on removal of radioactive iodine isotopes, such as $^{131}I$, removal of any iodine, whether in an elemental state or as compounds, is to be construed as being within the scope of the present invention.

What is claimed is:

1. A method for removing iodine from an iodine-containing off-gas stream comprising contacting said off-gas stream with a metallic fatty acid solution wherein said metal is selected from the group consisting of silver, copper, and mercury.

2. The method of claim 1 wherein said fatty acid solution comprises copper oleate.

3. An iodine removal filter comprising a filter medium of polyurethane backing impregnated with copper oleate.

References Cited

UNITED STATES PATENTS 2,920,718  1/1960  Howell et al. _____ 55—524
3,018,159  1/1963  Silverman _____ 23—2

OSCAR R. VERTIZ, Primary Examiner.

EARL C. THOMAS, Assistant Examiner.

U.S. Cl. X.R.

23—216; 55—71, 524; 252—426, 431